US011299223B2

United States Patent
Kunsch et al.

(10) Patent No.: US 11,299,223 B2
(45) Date of Patent: Apr. 12, 2022

(54) MID-ENGINE THREE WHEEL VEHICLE

(71) Applicants: Gregory W Kunsch, Virginia Beach, VA (US); Alexander Andre Kunsch, Virginia Beach, VA (US)

(72) Inventors: Gregory W Kunsch, Virginia Beach, VA (US); Alexander Andre Kunsch, Virginia Beach, VA (US)

( * ) Notice: Subject to any disclaimer, the term of this patent is extended or adjusted under 35 U.S.C. 154(b) by 429 days.

(21) Appl. No.: 16/524,106

(22) Filed: Jul. 28, 2019

(65) Prior Publication Data
US 2021/0024151 A1 Jan. 28, 2021

(51) Int. Cl.
*B62D 61/06* (2006.01)
*B60K 1/00* (2006.01)
*B60K 3/00* (2006.01)
*B60K 5/00* (2006.01)
*B60K 7/00* (2006.01)

(52) U.S. Cl.
CPC ............ *B62D 61/065* (2013.01); *B60K 1/00* (2013.01); *B60K 3/00* (2013.01); *B60K 5/00* (2013.01); *B60K 7/00* (2013.01); *B60K 2005/003* (2013.01)

(58) Field of Classification Search
CPC ........ B60K 2001/001; B60K 2007/003; B62D 61/065
See application file for complete search history.

(56) References Cited

U.S. PATENT DOCUMENTS

| 8,061,465 | B2 * | 11/2011 | Martino | B62K 5/05 180/311 |
| 9,604,683 | B2 | 3/2017 | Kunsch | |
| 10,513,303 | B2 * | 12/2019 | Frohnmayer | B60K 1/02 |
| 2008/0238140 | A1 * | 10/2008 | Kejha | B62D 29/008 296/181.1 |
| 2016/0176457 | A1 * | 6/2016 | de Haan | B60N 2/005 180/215 |
| 2016/0375944 | A1 * | 12/2016 | Kunsch | B60N 2/01 180/211 |
| 2021/0086852 | A1 * | 3/2021 | Kunsch | B60K 7/0007 |

OTHER PUBLICATIONS

Unknown Author, Can-am 2018 Models Web Site link: https://can-am.brp.com/on-road/2018-models.html Date: Jul. 28, 2019.
Unknown Author, 2019 Slingshot Lineup Web Site link: https://slingshot.polaris.com/en-us/slingshots/ Date: Jul. 28, 2019.
Unknown Author, 3 Wheeler Web Site link: https://www.morgan-motor.com/3-wheeler/ Date: Jul. 28, 2019.

(Continued)

*Primary Examiner* — James A English

(57) ABSTRACT

The general layout for a front wheel drive, three-wheeled vehicle with two steerable driven wheels in the front of the vehicle, and the motor or motors located in the mid-section of the vehicle. The vehicle is designed for compact motors, in-hub motors, and direct connect motors which allow a significant portion of the vehicle's weight to be moved forward, while integrating location of the passenger seating, steering, and driven wheels allows for a highly stable vehicle. The layout maintains the traditional bucket or bench style seats as found in today's automobiles, and yet allows for weighting and cockpit adaptability for different market demographics.

1 Claim, 3 Drawing Sheets

Depiction of motor location with respect to vehicle section (Front / Mid / Rear)

Present Invention – Mid Engine, Front wheel drive

(56) References Cited

OTHER PUBLICATIONS

Unknown Author, T-Rex Web Site link: https://campagnamotors.com/t-rex/ Date: Jul. 28, 2019.
Unknown Author, Wikipedia Stimson Scorcher Web Site link: https://en.wikipedia.org/wiki/Stimson_Scorcher Date: Jul. 28, 2019.
Unknown Author, 3-Wheelers.com Trihawk Web Site link: http://www.3wheelers.com/trihawk.html Date: Jul. 28, 2019.
Unknown Author, Wikipedia Dymaxion Web Site link: https://en.wikipedia.org/wiki/Dymaxion Date: Jul. 28, 2019.

* cited by examiner

*Embodiment: Dual side by side Passenger seating; Single Motor*
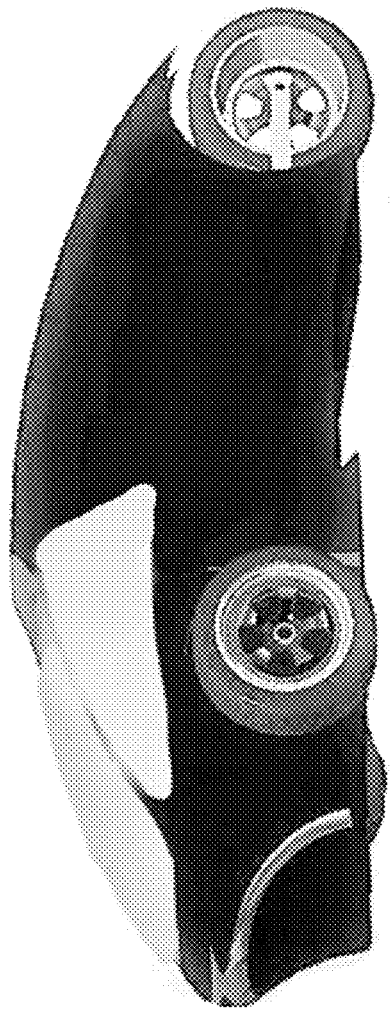
FIG. 1 Perspective View
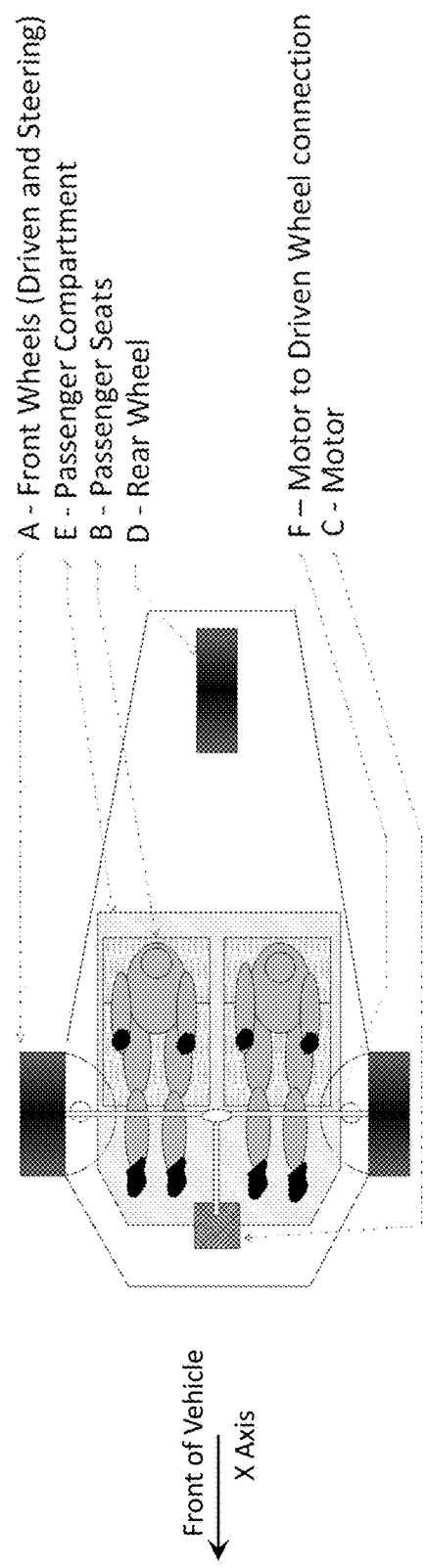
FIG. 2 Plan View

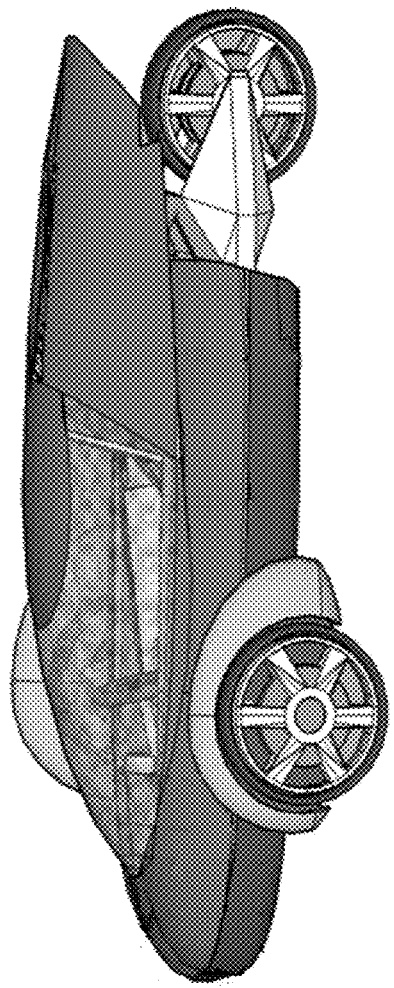
*Embodiment: Single Passenger; Dual Motor*
FIG. 3  Perspective View
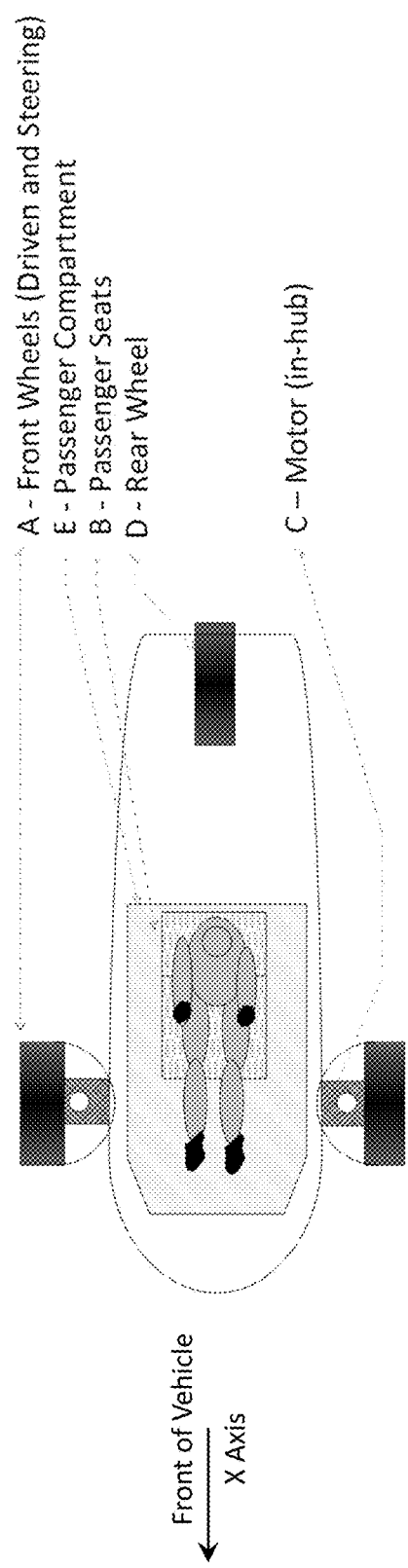
FIG. 4  Plan View

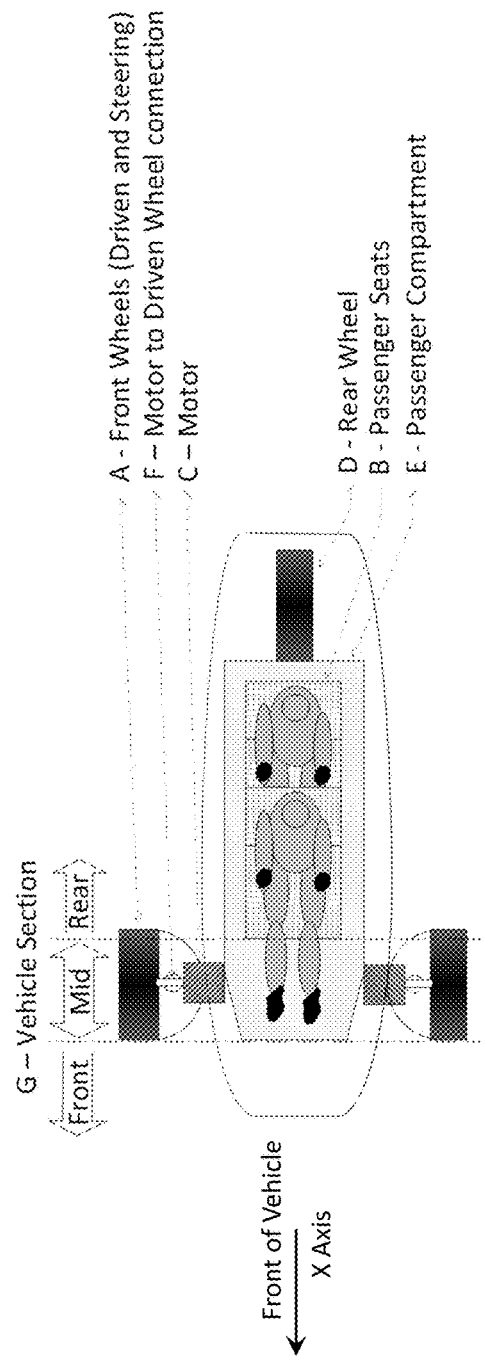
FIG. 5 Present Invention – Mid Engine, Front wheel drive
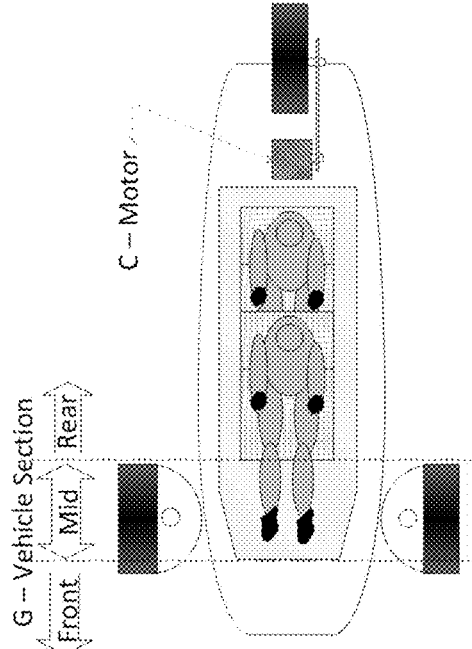
FIG. 7 Previous Art - Rear Engine, Rear wheel drive
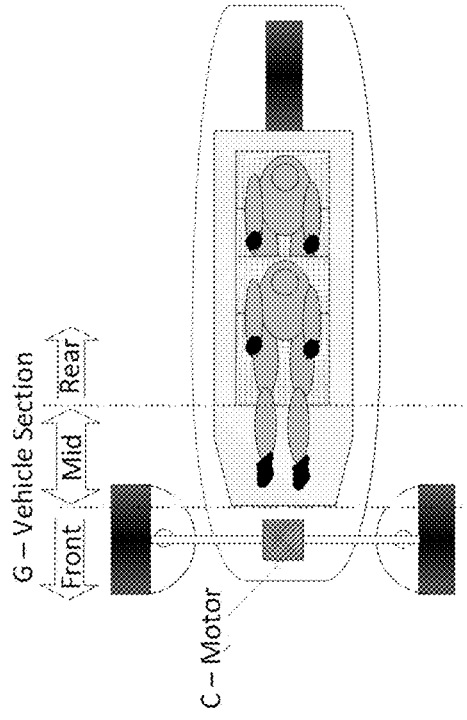
FIG. 6 Previous Art - Front Engine, Front wheel drive

MID-ENGINE THREE WHEEL VEHICLE

BACKGROUND

Field of the Invention

The present invention pertains to motor vehicles. More specifically, the present invention pertains to those having only three wheels.

Description of the Related Art

Three wheel vehicles come in a variety of types, whether two wheels in rear, two wheels in front, driven rear wheel(s), or driven front wheel(s). These types are well articulated in U.S. Pat. No. 9,604,683 (patent citation #1) and are exemplified in numerous vehicles and patents today. The present invention introduces Type 3-D as follows:
- Type-1—Two wheels in the rear of the vehicle with the rear wheels driven.
- Type 2—Two wheels in the front of the vehicle with the rear wheel driven. Variations of this are:
  - (A) Straddle type seating where the vehicle body or motor is straddled by the passenger, whether the motor is directly underneath, forward, or rearward of the driver. An example is a Can-Am Spyder (non-patent citation #1).
  - (B) Traditional seating with motor in front of the passenger compartment. Examples include Polaris Slingshot (non-patent citation #2) and Morgan 3 Wheeler (non-patent citation #3).
  - (C) Traditional seating with motor behind the passenger seat. An example is the Campagna T-Rex (non-patent citation #4).
- Type 3—Two wheels in the front of the vehicle with the front wheels driven. Variations of this are:
  - (A) Straddle type seating where the body or motor is straddled by the passenger, whether the motor is directly underneath, forward, or rearward of the driver. An example is the Stimson Scorcher (non-patent citation #5).
  - (B) Traditional seating with the motor in front of the passenger compartment. An example is the Trihawk (non-patent citation #6). This is referred to as 'front engine' design.
  - (C) Traditional seating with motor behind the front of passenger seat. This is referred to a 'rear engine' design.
    - (1) Rear wheel steering. An example is the Dymaxion car (non-patent citation #7).
    - (2) Front wheel steering. An example is U.S. Pat. No. 9,604,683 (patent citation #1).
  - (D) Traditional seating with motor in the mid-section of the vehicle, between the front of the passenger compartment and the front of the passenger seat. This type is introduced as the present invention. This present invention design will be referenced as 'mid-engine' design.

U.S. Pat. No. 9,604,683 (patent citation #1) describes the stability challenges with the various types of three wheel vehicles. With the advent of electric vehicles, motor sizes can be significantly smaller and can be produced in a variety of sizes. This allows for unique arrangements that can impact vehicle weighting and stability. Unlike previous art, the present invention places the motor or motors in-line with the passenger compartment, centering the vehicle weight for optimal stability.

The present invention retains the passengers towards the front, over widest part of the vehicle. The largest weight variable is the number and size of the passengers. With the present invention, the changes in the center of gravity for the vehicle due to loading variability are minimized Combining the passenger loading with the weight of the motors in the mid-section near the widest portion of the vehicle establishes the best possible vehicle dynamics under changing load conditions.

SUMMARY OF THE INVENTION

The present invention defines a unique three wheel vehicle variation where the wheels are arranged with two in the front of the vehicle and one in the rear, placing the motor in the midsection of the vehicle and driving the front wheels. A typical embodiment would be an electric motor driving each front wheel, with the center of the wheels placed just forward of the passenger seats parallel to the passenger compartment. Single, dual or multiple passenger variants are possible within the mid-engine configuration.

DESCRIPTION OF THE SEVERAL VIEWS OF THE DRAWING

Present Invention Drawings are as follows:
Drawing (1): Embodiment showing Dual passenger, single motor
FIG. 1—Embodiment—Perspective View
FIG. 2—Embodiment—Plan View
Drawing (2): Embodiment showing Single passenger, dual hub motors
FIG. 3—Embodiment—Perspective View
FIG. 4—Embodiment—Plan View
Drawing (3): Depiction of motor location with respect to vehicle section (Front/Mid/Rear)
FIG. 5—Present Invention—Mid Engine, Front wheel drive. Example embodiment depicts two motors, two passengers in serial seating arrangement.
FIG. 6—Previous Art—Front Engine, Front wheel drive
FIG. 7—Previous Art—Rear Engine, Rear wheel drive
On each of the drawings, items called out are as follows:
(A)—Front Wheels
(B)—Passenger Seats
(C)—Motors
(D)—Rear Wheel
(E)—Passenger Compartment
(F)—Motor to Driven wheel connection
(G)—Vehicle Section Before any embodiments of the invention are explained in detail, it is to be understood that the invention is not limited in its application to the details of construction and the detailed arrangement of components set forth in the following description or illustrated in the following drawings. The invention is capable of other embodiments not listed herein, and of being practiced or of being carried out in various ways. Also, it is to be understood that the phraseology and terminology used herein is for the purpose of description and should not be regarded as limiting.

DETAILED DESCRIPTION OF THE INVENTION

FIG. 5 portrays the general layout of the components of the present invention within the embodiment of a two passenger, serial seating arrangement with one motor. Regardless of the number or type of motors, and number or arrangement of seats, there are key components which define the present invention. The key components are two driven and steerable front wheels (item A), a rear wheel (item D) which is located behind the front wheels, a passenger compartment (item E) with conventional seats for one or more passengers, one or more passenger seats (item B), and one or more motors (item C) overlapping the midsection of the vehicle.

The mid-section of the vehicle (item G) is the area of the vehicle extending from the front of the seat to the front of the passenger compartment to along the X-axis. The X axis is the centerline of the vehicle extending from the front to the rear. If there are multiple seats, then mid-section is defined by the front of the forward most seat.

The motor is in a location that overlaps or partially overlaps the mid-section of the vehicle along the X axis. This does not imply that the motor must be in or part of the passenger compartment. The motor may be within or external to the passenger compartment itself. The overlap along the X axis may be full or partial. A full overlap is when the entire motor is within the mid-section plane of the vehicle. A partial overlap is when any portion of the motor overlaps the mid-section plane. Regardless of the amount of overlap, any overlap with the mid-section of the vehicle defines the vehicle as mid-engine and is within the context of the present invention. This overlap articulates the mid-engine design of the present invention.

As with the numerous embodiments of existing three wheeled vehicles, the present invention also has numerous possible embodiments. FIG. 1, 2, 3, 4 depict example embodiments of the present invention.

FIG. 1 and FIG. 2 show an example embodiment of the present invention with dual passenger side by side seating and a single motor. The key components are two driven and steerable front wheels (item A), a rear wheel (item D) which is located behind the front wheels, a passenger compartment (item E) with conventional seats for one or more passengers, one or more passenger seats (item B), and a motors (item C) overlapping the midsection of the vehicle.

FIG. 3 and FIG. 4 show an embodiment with single passenger seating and dual motors. The key components are two driven and steerable front wheels (item A), a rear wheel (item D) which is located behind the front wheels, a passenger compartment (item E) with a conventional seat for one passengers, one passenger seat (item B), and two motors (item C) overlapping the midsection of the vehicle. An exemplary embodiment would use in-hub electric motors directly attached to the wheels, or electric motors attached via a shaft.

FIG. 5 depicts the motor location with respect to vehicle section, whether Front, Mid, Rear section. The example embodiment is the present invention with dual passenger serial seating and dual motors, and shows the mid-section of the vehicle. To help contrast the present invention from previous art, FIG. 6 and FIG. 7 are provided. FIG. 6 depicts existing art with the motor located in the front section of the vehicle, which is typically known as a front engine vehicle. FIG. 7 depicts existing art with the motor located in the rear section of the vehicle, which is typically known as a rear engine three wheel vehicle.

The present invention may utilize a variety of motor to driven wheel connection types (item F) and is not limited by possible types. Example connection types may include chain, belt, hydraulic, shaft, or direct. The method used to connect the motor to the wheels is not critical to the intent of the present invention. In certain embodiments, such as an in-hub motor, there may not be any additional connections required between motor and wheel.

The present invention is not limited by motor type or number of motors. Gasoline, Hydrogen, Steam, Electric and other motor type embodiments are not limiting factors of the present invention. The terms motor and engine are used interchangeably and are not viewed as limiting terms within the present invention.

If seating is adjustable, references to 'front of seat' indicate the forward most position of the seat. If multiple seats are used, the 'front of seat' refers to the seat in the forward most position in the vehicle.

The present invention is limited to standard sit-in or sit-on type passenger seats (Item B), which is also referred to as 'traditional' seating. The present invention does not extend to vehicles with straddle seating, in which the passenger has one leg or foot on either side of the motor or primary body of the vehicle, regardless of whether the passenger is in a forward leaning, vertical, rearward leaning, reclined, or horizontal position. Straddle type seating may have the motor directly underneath, forward, or rearward of the driver.

In addition to items noted above, the present invention is not limited by:

frame or body structure type or material.

distances between items.

classification of vehicle such as motorcycle or car.

construction details.

suspension types and variations.

body types.

other vehicle components.

While this invention has been described with several embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A three wheel vehicle comprising:

two driven front wheels which allow primary directional control of the vehicle;

a single non-driven rear wheel;

a passenger compartment, the compartment comprising one or more traditional passenger seats;

a mid-section, comprising the area of the passenger compartment forward of the front of the seat;

a motor or motors to propel the vehicle either directly or indirectly through the front wheels, located in a position which transversely overlaps the mid-section.

* * * * *